(12) United States Patent
Prothia et al.

(10) Patent No.: US 7,155,427 B1
(45) Date of Patent: Dec. 26, 2006

(54) CONFIGURABLE SEARCH TOOL FOR FINDING AND SCORING NON-EXACT MATCHES IN A RELATIONAL DATABASE

(75) Inventors: Gautam Prothia, Banlara Hills Hyderabad (IN); Alan Fothergill, Half Moon Bay, CA (US); Charity D. Kocher, Sunnyvale, CA (US); Srinivasa Rangan, Foster City, CA (US); Carol Chow, Burlingame, CA (US); Jyoti Pandey, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 429 days.

(21) Appl. No.: 10/285,029

(22) Filed: Oct. 30, 2002

(51) Int. Cl.
*G06F 7/00* (2006.01)
*G06F 12/00* (2006.01)
*G06F 17/30* (2006.01)

(52) U.S. Cl. .................... 707/3; 707/4; 707/5; 707/200
(58) Field of Classification Search .................... 707/1, 707/3, 4, 5; 704/9, 231, 235, 251
See application file for complete search history.

(56) References Cited

U.S. PATENT DOCUMENTS

| | | | | |
|---|---|---|---|---|
| 4,791,561 A * | 12/1988 | Huber | ............................ | 707/1 |
| 5,404,507 A * | 4/1995 | Bohm et al. | .................... | 707/4 |
| 5,450,580 A * | 9/1995 | Takada | ........................... | 707/5 |
| 5,497,486 A * | 3/1996 | Stolfo et al. | .................... | 707/7 |
| 5,754,938 A * | 5/1998 | Herz et al. | .................. | 725/116 |
| 5,802,515 A * | 9/1998 | Adar et al. | .................... | 707/5 |
| 5,832,499 A * | 11/1998 | Gustman | ................ | 707/103 R |
| 6,189,002 B1 * | 2/2001 | Roitblat | ......................... | 707/1 |
| 6,269,368 B1 * | 7/2001 | Diamond | ....................... | 707/6 |
| 6,363,377 B1 * | 3/2002 | Kravets et al. | ................. | 707/4 |
| 6,374,241 B1 * | 4/2002 | Lamburt et al. | ............... | 707/6 |
| 6,381,601 B1 * | 4/2002 | Fujiwara et al. | ............... | 707/7 |
| 6,480,838 B1 * | 11/2002 | Peterman | ....................... | 707/3 |
| 6,578,032 B1 * | 6/2003 | Chandrasekar et al. | ........ | 707/6 |
| 6,615,172 B1 * | 9/2003 | Bennett et al. | ............. | 704/257 |
| 6,714,941 B1 * | 3/2004 | Lerman et al. | ............. | 704/254 |
| 6,775,666 B1 * | 8/2004 | Stumpf et al. | .................. | 707/5 |
| 6,834,276 B1 * | 12/2004 | Jensen et al. | ................... | 707/2 |
| 2002/0059161 A1 * | 5/2002 | Li | ................................. | 707/1 |

(Continued)

OTHER PUBLICATIONS

Luk, Robert, et al. "A Comparison of Chinese Document Indexing Strategies and Retrieval Models." vol. 1, No. 3, Sep. 2002, pp. 225-268.*

(Continued)

*Primary Examiner*—Don Wong
*Assistant Examiner*—Charles E. Lu
(74) *Attorney, Agent, or Firm*—Young Law Firm, P.C.

(57) ABSTRACT

A computer-implemented method of searching for exact and non-exact matches in a first database includes steps of transforming and standardizing values of selected attributes stored in the first database according to selected first transformation functions while maintaining the first database unchanged; storing the transformed and standardized values of the selected attributes in a second database that is separate from the first database; providing an input record against which to compare contents of the second database; transforming and standardizing values of selected attributes of the provided input record according to selected second transformation functions, and searching only the second database for at least one of exact and non-exact matches to the transformed and standardized values of the selected attributes of the input record according to selected match rules.

26 Claims, 4 Drawing Sheets

U.S. PATENT DOCUMENTS

2003/0233350 A1* 12/2003 Dedhia et al. .................. 707/3

OTHER PUBLICATIONS

Lee, Mong Li et al. "IntelliClean: A Knowledge-Based Intelligent Data Cleaner." KDD 2000, copyright ACM 2000, pp. 290-294.*

Schneiderman et al. "Sorting Out Searching: A User Interface Framework for Text Searches." Communications of the ACM, Apr. 1998, vol. 41, No. 4, pp. 95-98.*

Tejada, Sheila et al. "Learning Domain-Independent String Transformation Weights for High Accuracy Object Identification." SIGKDD 02, copyright 2002 ACM, pp. 350-359.*

Perfect Data and Mark Yannone. Perfect Data Database Management Services. Online. Internet Archive dated Jun. 6, 2002. http://www.webdedication.com/perfectdata/NewFiles/databases.html. 3 pages.*

"Ultra DMA (UDMA) Modes", The PC Guide (http://www.PCGuide.com), Site Version 2.2.0—Version Date: Apr. 17, 2001, printed Sep. 26, 2002.

"Oracle Trading Community Architecture Data Quality Management User Guide", Jan. 2002.

* cited by examiner

| WORD LIST NAME | LANGUAGE | ORIGINAL WORD | REPLACEMENT WORD |
|---|---|---|---|
| Person Name | Am. English | Bob | Robert |
| Person Name | Am. English | Rob | Robert |
| Person Name | Am. English | Robbie | Robert |
| Person Name | Am. English | Roberto | Robert |
| Person Name | Am. Englsih | Bobby | Robert |

CONFIGURABLE SEARCH TOOL FOR FINDING AND SCORING NON-EXACT MATCHES IN A RELATIONAL DATABASE

BACKGROUND OF THE INVENTION

1. Field of the Invention

The present invention generally relates to computer-implemented methods and systems for searching for information within a relational database. More particularly, the present invention relates to methods for searching and scoring exact as well as non-exact matches in a relational database, as well as computer-implemented methods for identifying and removing duplicate entries in relational databases, and methods for preventing future input of duplicate entries therein.

2. Description of the Related Art

Searching for specific information in a database can be difficult, for several reasons. For example, the data that is sought may have been improperly entered into the database and may include typographical errors, misspellings and abbreviations. Moreover, the information entered by the user on which the search is to be conducted may itself suffer from these issues. Even if the information in the database is correctly entered, it may have been entered differently than expected. The information sought may, in fact, may have been entered into the database two or more times, as the same party name can be entered in different ways. For example, IBM may have been entered in the database as IBM, IBM Corp, International Business Machines etc. Even in the case wherein there is a 100% match within 2 or more records on the party name, the matching records might actually refer to different parties. For example, there could be several records including John Smith as the party name, but each of them might be different parties.

To successfully search such information in the database may require the user to code complex SQL queries, which is not feasible for most users. Many databases accessed by business applications contain information associated with logical entities such organizations, addresses, contacts, and contact points. However, information related to such logical entities is prone to great variation in the manner in which it is entered into a database. Therefore, users accessing such a database may experience difficulties as they attempt to search for specific information on these entities in the database. What are needed, therefore, are computer-implemented methods for efficiently and successfully searching such information and returning potential matches in the presence of duplicative data, incomplete data, partially incorrect data or mistakes in the search input data. What are also needed are computer-implemented methods of identifying and removing duplicate records in the database, even in the presence of less-than fully consistent records in the database. Thereafter, there remains the need to prevent the future entry of such duplicates, irrespective of the source of such duplicate entries such as on-line forms and batch entry of customers, leads, etc.

SUMMARY OF THE INVENTION

It is, therefore, an object of the present invention to provide methods and systems for searching databases for exact as well as non-exact matches, for identifying duplicative entries as well as methods for removing or merging such duplicative database entries.

In accordance with the above-described objects and those that will be mentioned and will become apparent below, a computer-implemented method of searching for exact and non-exact matches in a first database may include steps of transforming and standardizing values of selected attributes stored in the first database according to selected first transformation functions while maintaining the first database unchanged; storing the transformed and standardized values of the selected attributes in a second database that may be separate from the first database; providing an input record against which to compare contents of the second database; transforming and standardizing values of selected attributes of the provided input record according to selected second transformation functions, and searching only the second database for at least one of exact and non-exact matches to the transformed and standardized values of the selected attributes of the input record according to selected match rules.

The first transformation functions may be the same as the second transformation functions. The first transformation functions may include one or more of the following steps: removing non-alpha numeric characters; removing vowels; removing selected noise words; removing double letters, and converting to upper case. The first transformation function may include replacing at least one word of values of selected attributes stored in the first database with a replacement word. The replacement word may be stored in a replacement table that maps variations of a selected word onto a standardized version of the selected word. The selected match rules may include scoring criteria and a score may be assigned to each of (the one or more) exact and non-exact matches. The method may further include a step of providing (such as displaying to the user, for example) the exact and/or non-exact match(es) according to the assigned score. The searching step may include a step of returning a set of at least one potential matching record within the second database, the potential matching record(s) of the set containing attributes that match the transformed and standardized values of the selected attributes of the provided input record. The selected match rules may include scoring criteria and the method further may include a step assigning a score to each record of the returned set. A step of weighting the assigned score by a selected weight may also be carried out. The method may also include a step of comparing the score assigned to each record of the returned set against a selected threshold and returning as matches only those records of the returned set having assigned scores above the selected threshold. For non-exact matches, the method may further include the step of determining the extent of similarity between the transformed and standardized values of the selected attributes of the provided input record and values of the corresponding attributes in the second database. The extent of similarity may be determined, for example, by determining an edit distance between the non-exact matches and the transformed and standardized values of the selected attributes of the provided input record, the edit distance being equal to a number of changes required to make the non-exact matches match the transformed and standardized values of the selected attributes of the provided input record exactly; subtracting the edit distance from a number of characters in a longest one of the non-exact matches; dividing a result of the subtracting step by a number of characters in a longest one of the non-exact matches, and expressing a result of the dividing step as an integer. The method may further include a step of maintaining the second database in synchronism with the first database.

According to another embodiment, the present invention is a computer-implemented method of maintaining records in a first database, the first database storing a plurality of attributes, the method including a first transforming and standardizing step to transform and standardize values of selected attributes stored in the first database according to first transformation and standardization functions while maintaining the first database unchanged; a storing step to store the transformed and standardized attribute values in a second database that may be separate from the first database; a providing step to provide an input record against which to compare contents of the second database; a second transforming and standardizing step to transform and standardize values of the attributes of the provided input record according to second transformation and standardization functions; an applying step to apply match rules to compare the standardized attribute values of the provided input record to the standardized attribute values stored in the second database, and to identify a set of potential duplicate records based upon results of the application of the match rules, and carrying a step of merging the provided input record with the at least one record of the set of potential duplicate records or a step of preventing the provided input record from being incorporated in the first database.

The first and second transforming and standardizing steps may apply identical transformation functions to the attributes values of the attributes stored in the database and to corresponding attribute values of the provided input record. The method may further include a step of scoring the set of potential duplicate records according to predetermined scoring criteria. The scoring step may include a step of assigning a percentage weight to each of the first transformation functions, the assigned weight being dependent upon a degree of similarity between the transformed and standardized attribute values and corresponding values stored in the first database.

According to still another embodiment, the present invention is a database system, comprising a first database that stores attributes and corresponding values of the attributes; first means for reading, transforming and standardizing the attribute values stored in the first database is such that an effect of typographical errors and variations in the stored attribute values may be minimized, the first means maintaining the first database unchanged; a second database coupled to the first means, the second database storing the transformed and standardized attribute values, and second means for searching the second database for exact and non-exact matches to an input record or for duplicates according to selected match rules.

The database system may further include means for maintaining the second database in synchronism with the first database. The first means may be configured to carry out one or more of the following steps on the values of the attributes: removing non-alpha numeric characters; removing vowels; removing selected noise words; removing double letters, and converting to upper case.

The first means may be configured to replace at least one word of values of selected attributes stored in the first database with a replacement word. The replacement word may be stored in a replacement table that maps variations of a selected word onto a standardized version of the selected word. The selected match rules may include scoring criteria and a score may be assigned to each of the at least one exact and non-exact matches. The second means may be further configured to return a set of at least one potential matching record within the second database, the at least one potential matching record of the set containing attributes that match the transformed and standardized values of the selected attributes of the provided input record. The selected match rules may include scoring criteria and the second means may be further configured to assign a score to each record of the returned set. The second means may be further configured to compare the score assigned to each record of the returned set against a selected threshold and to return as matches only those records of the returned set having assigned scores above the selected threshold. For non-exact matches, the second means may be further configured to determine an extent of similarity between the transformed and standardized values of the selected attributes of the provided input record and values of the corresponding attributes in the second database. For example, the extent of similarity may be determined by: determining an edit distance between the non-exact matches and the transformed and standardized values of the selected attributes of the provided input record, the edit distance being equal to a number of changes required to make the non-exact matches match the transformed and standardized values of the selected attributes of the provided input record exactly; subtracting the edit distance from a number of characters in a longest one of the non-exact matches; dividing a result of the subtracting step by a number of characters in a longest one of the non-exact matches, and expressing a result of the dividing step as an integer. The second means may be further configured to assign a percentage weight to each of the first transformation functions.

BRIEF DESCRIPTION OF THE DRAWINGS

For a further understanding of the objects and advantages of the present invention, reference should be had to the following detailed description, taken in conjunction with the accompanying figures, wherein.

DESCRIPTION OF THE INVENTION

Definitions

Acquisition Acquisition is the part of the matching process that matches input record attributes against the attributes in the staged database to generate a smaller group of records that form the work unit. This process narrows down the records that can be scored in the scoring part of the matching process.

Attribute: An attribute corresponds to a column in a table in the source database, and the attribute value is the value that is stored in the column. For example, party name is an attribute and the actual values of party names are stored in a column in the table in the source database that stores the party values.

Automatic Merge Threshold See Threshold.

Exact Search A technique that requires an exact character match to satisfy the search, as compared to a search that uses a similarity algorithm.

Input Record The record that is being used as the basis for comparison or matching. Input records may be compared to other records in the staged database to find existing duplicates in the source database. An input record can also be search criteria or party information that is entered into or provided by an application that is configured to implement the present invention.

Logical Entity: A logical entity is group of related attributes. For brevity's sake, only four logical entities are discussed herein, although it is understood that the present invention is not limited thereto. These four exemplary logical entities discussed herein include Parties, Addresses, Organization Contacts and Contact Points. Each logical entity also includes custom attributes that can be used for attributes that are not already seeded.

Match rules A set of rules that determine if data should be selected and displayed as a match. These match rules may use transformation functions and/or a similarity algorithm. A match rule includes acquisition attributes that are used for matching and can also include scoring attributes to score the matched records.

Match Threshold See Threshold.

Organization Person A person who acts on behalf of or in the context of an organization.

Override Threshold See Threshold.

Party A person or organization or collection of parties that can enter into relationships with other parties.

Party Relationship Business relationship between two parties.

Score Scores are assigned in integer form to attributes. Scores are not limited to the range of 1 to 100 and may be multiplied by a weight percentage to calculate the match score.

Scoring Attribute The filter conditions used in the matching process for comparing records within the work unit.

Scoring The function of assigning scoring and weighting factors to match results, aggregating them and ranking the match results.

Similarity Scoring A similarity algorithm that computes the edit distance between two strings and assigns a percentage value to the output.

Source database The database that contains the raw data that is transformed and standardized to populate the staged database. According to an embodiment of the present invention, the source database is a central repository of party information for applications that require such party information. The party information includes details about organizations and people, the relationships among the parties, and the places where the parties do business.

Soundex Soundex is an indexing system that can group words by sound instead of exact spelling. Soundex translates words into a four-digit code consisting of one letter and three numbers.

Staged Database A mirror of the source database into which the data from the source database entities have been transformed and standardized based on the transformations defined in order to facilitate better matching.

Standardize A data manipulation technique that is used to improve the quality of matching. To standardize in the context of the present invention includes transforming words or phrases into the same format.

Threshold Automatic merge, match, and override thresholds are values that may be used in matching. A record with a score that exceeds the match threshold may be selected as a match for the input record. A record with a score that exceeds the automatic merge threshold may be selected for party merge. Other applications that implement the present invention can prevent the input record from entering the source database if a duplicate is found that exceeds the override threshold.

Transformation Function A seeded or user-defined rule that is utilized to change attributes in the database into representations that can assist in the identification of potential matches. Transformation functions are used to improve the quality of matching. To transform attributes in the English language may include, for example, removing double letters, removing non-alpha-numeric characters and removing all vowels. Other manipulations may be implemented to cleanse attributes. Other languages may require different data manipulations to transform attributes.

Weight A percentage that is assigned to a transformation function and is used to factor the score of an attribute.

Weighted Rule: A match rule which allows one to indicate the relative importance of the attributes taking part in the rule. A match rule has a user specified integer value assigned to it if the rule is true. The sum of these values for all the match rules must exceed a user specified threshold for the records to be considered matched.

Word Replacement A table that is populated with words that are used for search key creation and normalization. Base words in the party, account, address or organization contact record are replaced with a normalized word during search key creation in order to provide consistency in search results.

Work Unit A work unit consists of all records whose attributes match that of the input record.

Functional Description

Figure 1:
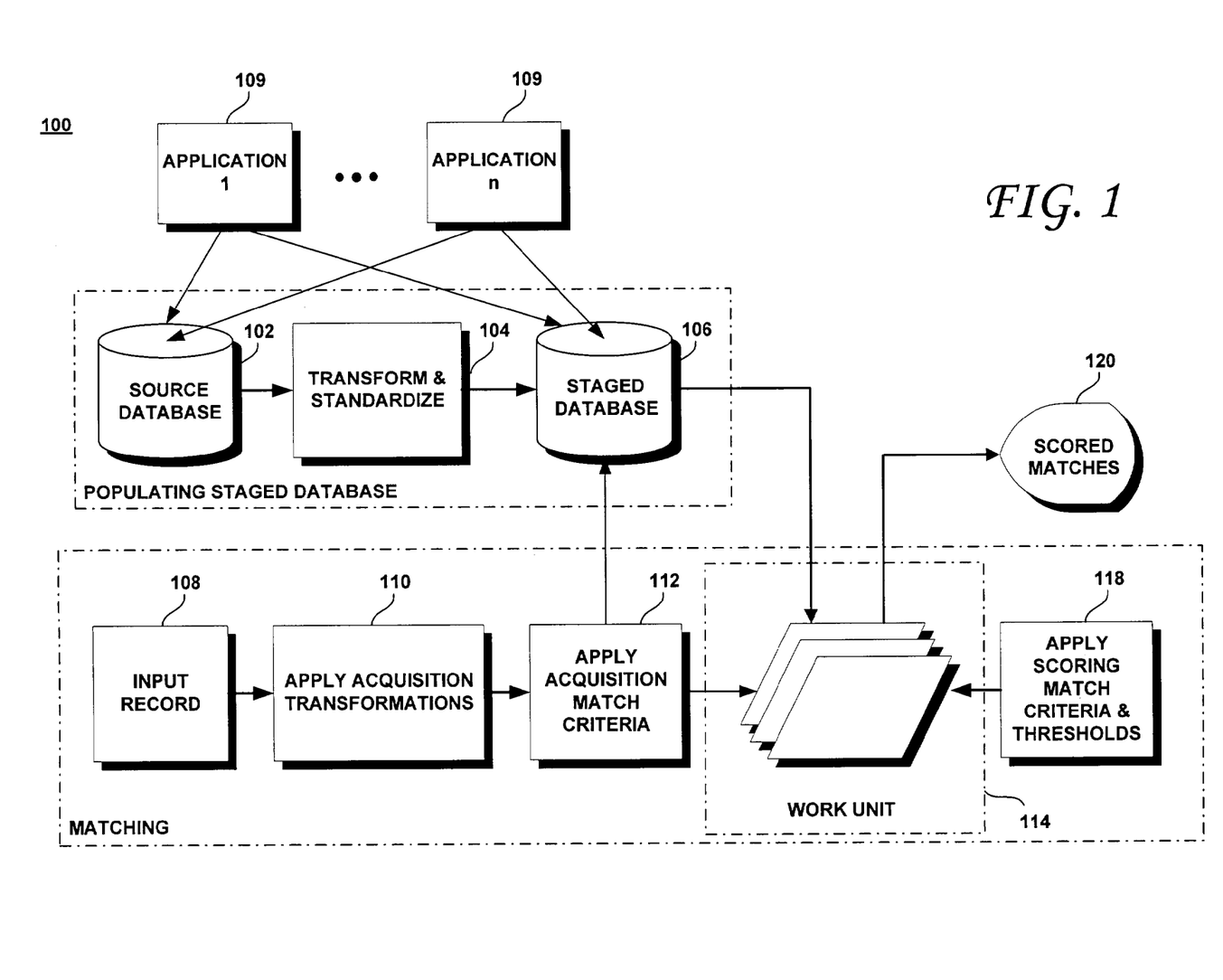
FIG. 1 is a block diagram illustrating a database system according to an embodiment of the present invention as well as certain aspects of the computer-implemented methods of present invention.

FIG. 1 is a diagram illustrating aspects of the present invention. As shown therein, the database system and configurable search tool 100 according to an embodiment of the present invention includes a relational source database 102. The relational source database 102 stores a plurality of records, each of which may include one or more logical entities that, in turn, include one or more attributes and associated attribute values. For illustrative and exemplary purposes only, the relational source database 102 is described herein as storing records that include the following logical entities:

1) Parties
2) Addresses
3) Organization Contacts
4) Contact Points

Each of these logical entities may include a plurality of attributes and associated attribute values. For example, the Parties logical entity includes attributes such as Party Name, the value of which is the name of a particular party that may be stored in a Party Name table within the source database 102. Other attributes in the Parties logical entity may include, for example, Title, and Year Established. The logical entities listed above contain much of the information that is routinely collected by parties that have entered into a business relationship within one another. Such information may be directly accessed by a user through appropriately formatted SQL queries, according to the searching functionality of the present invention and/or by various applications 109, through appropriate Application Program Interfaces (APIs). The present invention, however, is not limited to searching on attributes of the above-listed logical entities, but may be extended to search on attributes of other logical entities, as those of skill will readily recognize. In addition, the present invention provides for extending any logical entity to include customizable attributes to allow searches to be carried out on attributes that are not a part of the four logical entities listed above.

According to the present invention, the searching is preferably not carried out directly on the source database 102. Instead, the values of selected attributes of selected logical entities stored in the source database are transformed and standardized as shown at 104 in FIG. 1 according to selected transformation functions. Preferably, specific transformation functions are selected for each attribute. Thereafter, the standardized and transformed attributes are stored in a second database 106, herein called the staged database. It is on this staged database 106 that the configurable search tools according to the present invention are applied. Preferably, the relational source database 102 and the staged database 106 are maintained in synchronism, with the staged database 106 being (periodically, for example) updated with the transformed and standardized selected attributes of any new records in the source database 102.

Populating the staged database 106 from the raw data in the source database 102 may include the following steps:

1) Defining transformation functions;
2) Defining word replacements,
3) Transforming and standardizing the data in the source database 102 by applying the defined transformation and word replacement functions, and
4) Storing the transformed and standardized data in the staged database.

Defining Transformation Functions

Defining Transformation Functions

Defining and applying user-defined transformations on selected attribute values within the source database 102 results in transformed and standardized attribute values that are used for matching in order to achieve high quality search results. The attribute values, according to the present invention, are transformed and standardized to avoid matching on the raw data within the source database 102, which may result in missing or inconclusive matches. Indeed, the raw party information may include typographical errors, spelling errors, inconsistent formats, and abbreviations due to input errors. Transformation functions substantially neutralize the effects of such data errors on searches and increase the usefulness of the attribute values for the purpose of matching records. For example, a transformation function may remove all of the double letters in a party name and transform a name such as Allied Freight into Allied Freight. This transformation, although seemingly introducing a typographical error, actually makes it easier to match to a party if a typographical error, such as a missing double letter, exists in the source database 102. The values of the attributes of the selected logical entities within the source database 102, therefore, benefit from transformation and standardization before matching operations are performed.

Users, for example, may define transformation functions to perform the following actions:

Removing non-alpha numeric characters;
Removing vowels;
Removing noise words like 'The', 'And', 'Ltd', 'Company', 'Co', 'To', 'Inc', 'Incorporated', 'Of', 'Corp', and 'Corporation';
Removing double letters (i.e., retaining only one of the double letters), and
Converting to upper case.

Figure 2:
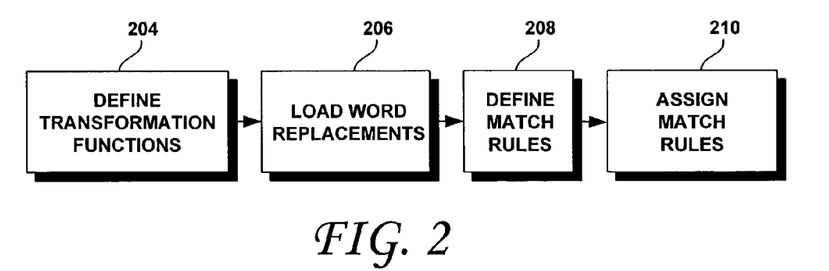
FIG. 2 is a flowchart illustrating further aspects of the present invention.
Figure 3:
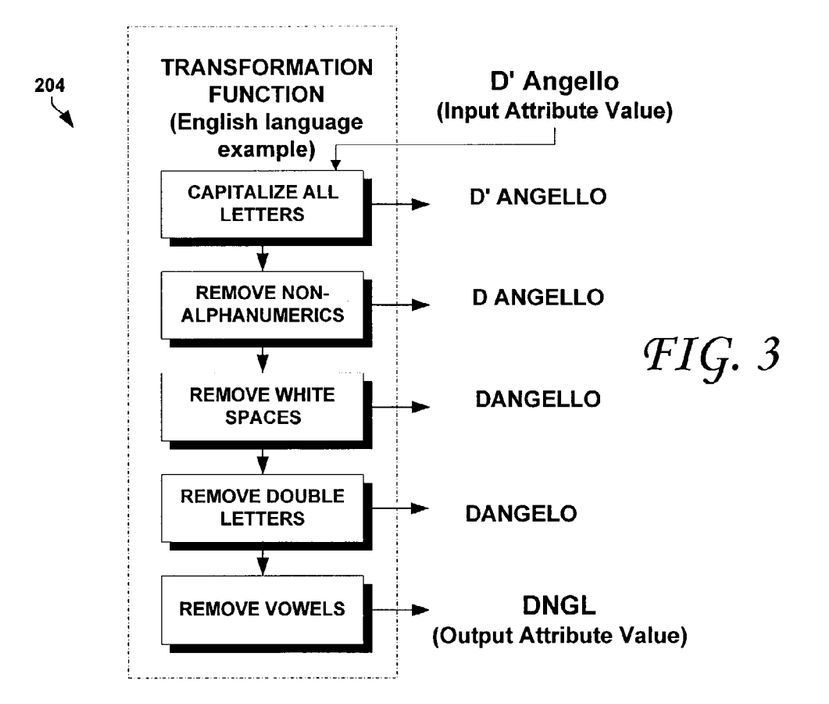
FIG. 3 is a flowchart illustrating an exemplary transformation function according to an embodiment of the present invention.

As specifically shown in FIG. 2, an exemplary last name attribute value of "D' Angello" is the input value to which the defined transformation functions 204 are to be applied. It is to be noted that the illustrated transformation function 204 is but an example of a transformation function that may work well for transforming and standardizing last name attribute values of the Parties logical entity, in the English language. Other transformation functions may be defined, and other transformation functions may be defined, added or substituted for those shown in FIG. 2, to account for industry specific requirements or to account for different languages, for example. As shown, the attribute value "D' Angello" may first be transformed by capitalizing all letters, to form "D' ANGELLO". Thereafter, all non-alphanumeric characters may be removed, yielding "D ANGELLO". All white spaces may then be removed, resulting in "DANGELLO". Thereafter, all double letters may be removed, which results in "DANGELO" after which the value may be stripped of all vowels, yielding a transformed and standardized attribute value of "DNGL".

After the raw data in the source database 102 has been transformed and standardized and the transformed and standardized attribute values stored in the staged database 106, match rules 208 (FIG. 2) may be defined at 208 and assigned to the attributes, as shown at 210 in FIG. 2. The match rules 208 may be applied to the transformed and standardized data in the staged database 106 to score each record to determine if the record is considered alike enough to be a match to an input record, shown in FIG. 1 at reference 108. A number of seeded transformation functions (such as 255 for each attribute, for example) may be defined. In addition, user-defined transformation functions may also be defined and mapped onto the selected logical entities.

The attributes may also be transformed using PL/SQL functions. Such transformed attributes may then be available for building match rules. For example transformation functions may be defined that extract sub-strings, replace specific characters, or join two or more data elements.

A number of transformation functions may be predefined for each of the selected logical entities. Exemplary ones of such predefined transformation functions are shown in Appendix A.

Defining Word Replacements

Figure 4:
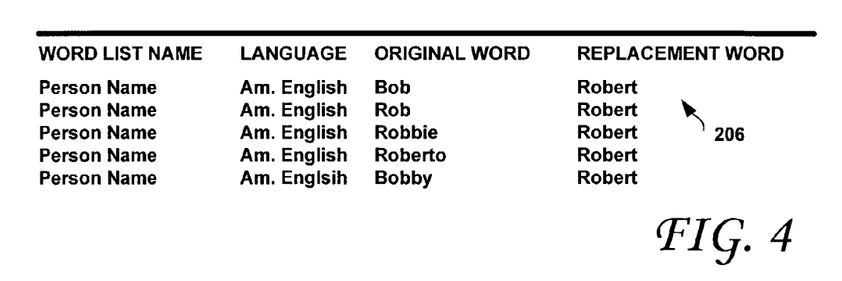
FIG. 4 is a table illustrating an example of word replacement, according to further aspects of the present invention.

Transformation functions may use word mappings to create synonyms that are treated as equivalents for matching. This is particularly useful for standardizing certain data elements in the source database 102 to minimize the effect of data entry inconsistencies on searches. To account for different languages, different word mappings per language may be loaded, as shown at 206 in FIG. 2. The different word mappings may be defined using a Word Replacement Thesaurus, an example of which is shown in FIG. 4 at reference numeral 206. Word replacements are created by specifying the original word and the replacement word; that is, the word for which a replacement is created. FIG. 4 shows an example of a word replacement transformation in which a number of variations on the proper names Bob, Rob, Robbie, Roberto and Bobby are each mapped to "Robert". Another example of such a word replacement transformation function is presented below. For example, if a user wishes to have the words/phrases that are used in American English Addresses such as Parkway, Pkwy, Pk all evaluated to the same expression (as PK) in a search, a word replacement transformation function may be defined as follows:

| Country Code | Word List Name | Original Word | Replacement Word |
|---|---|---|---|
| USA | Address | Parkway | PK |
| USA | Address | Pkwy | PK |
| USA | Address | Pky | PK |

Using the above word replacement transformation function, if a search were performed using the address 598 Pine Pkwy as input value against the source database 102 that contains the address 598 Pine Parkway, a match would be returned, as both addresses equate to 598 Pine PK.

Transforming and Standardizing the Data in the Database

After having defined the transformation and word replacement functions, the transformation and word replacement functions may be applied against the attribute values of the selected attributes of the selected logical entities within the source database 102.

Storing the Transformed and Standardized Data in the Staged Database

The transformed and standardized attribute values may now be stored in the staged database 106. The staged database 106 includes a separate set of database tables that store a portion of the data in the source database 102 upon which transformation functions have been applied to standardize the data for improved matching. According to the present invention, during matching, an input record 108 may be compared against the records in the staged database 106 instead of against the records in the source database 102. Alternatively, the records in the staged database 106 may be compared against each other to determine the presence of any potential duplicate records in the staged database 106. Such potentially duplicative records may then be scored and potentially merged with existing records or eliminated. According to an embodiment of the present invention, the source database 102 is left intact, and only the staged database 106 is changed.

Figure 5:
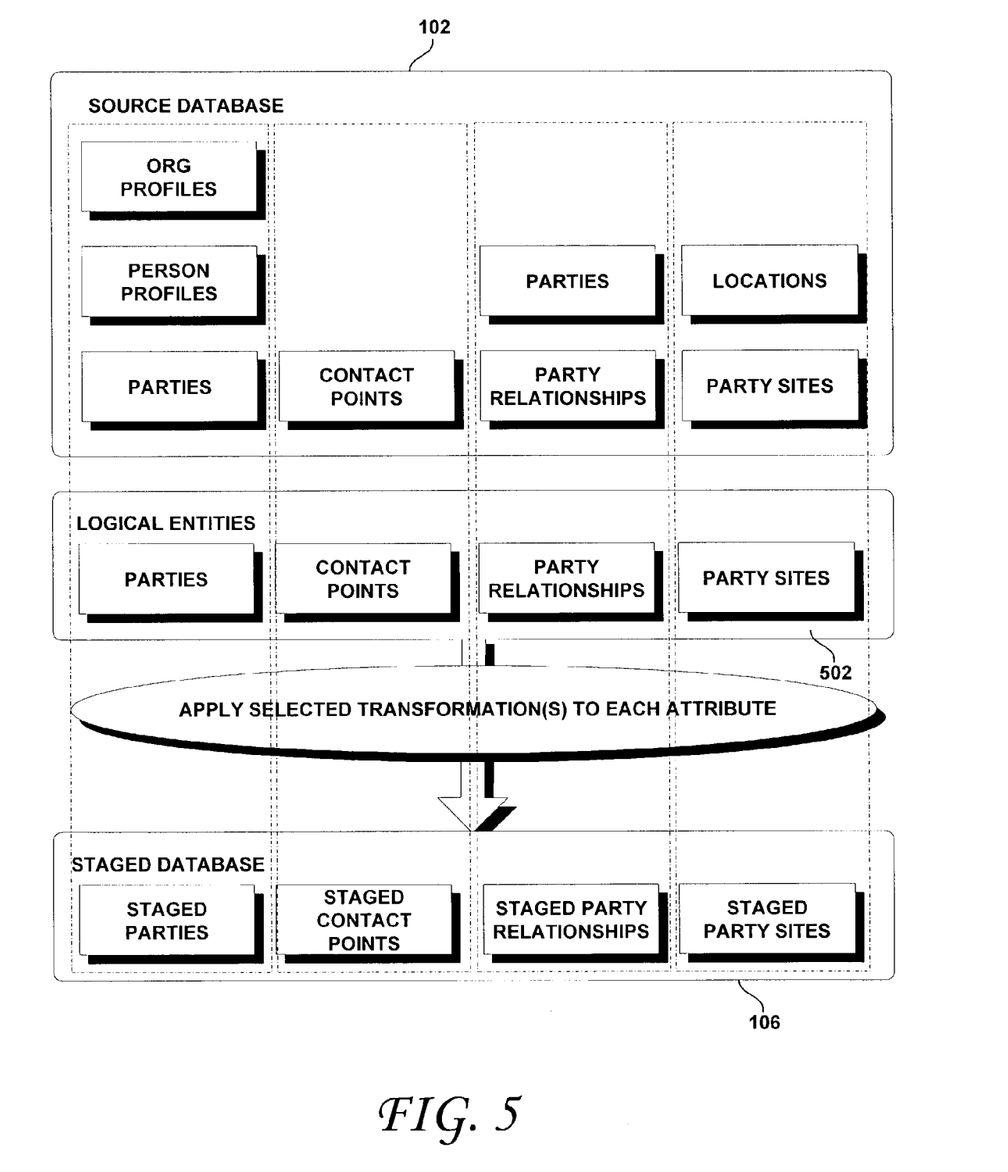
FIG. 5 is a representation of the logical structure of and the relationship between the source database and the staged database, according to an embodiment of the present invention.

FIG. 5 is a representation of the logical structure of and the relationship between the source database 102 and the staged database 106 according to an embodiment of the present invention. The source database 102 contains tables that store the raw data values for each attribute of each logical entity 502. For example, the table "Contact Points" contains the raw values for the contact point attribute of the Contact Point logical entity. Each table in the source database 102 that stores attributes belonging to the selected logical entities 502 is transformed and standardized, the result of such transformations and standardizations being stored in corresponding tables within the staged database 106. The tables in the database 106, therefore, contain attribute values that have been transformed and standardized according to a selected transformation function or functions chosen for each selected attribute. For example, for the Party logical entity, the party name attribute may be selected for inclusion in the staged database 106 and a number of transformation functions may be selected to transform and standardize the party names. Each attribute, in essence, corresponds to a column in a table of the source database 102 that stores the attribute value, and the staged database 106 contains the transformed and standardized versions of those values.

Transforming and Standardizing the Input Record

Before searching on an input record 108 can take place, the input record 108 (however entered—e.g., manual input, online form, data capture, etc.) must be transformed and standardized in the same manner as the data from the source database 102 was transformed and standardized to populate the staged database 106. This process is shown at 110 in FIG. 1. Preferably, the same transformations and standardizations as were discussed relative to reference 104 in FIG. 1 are also applied to the input record 108. That is, if the input record 108 is "D' Angello", the transformed and standardized input record would also be "DNGL".

Defining and Applying Match Rules

Match rules may be defined and applied against the transformed and standardized data in the database 106 to identify and score matches and duplicates. Match rules may be defined based upon the defined transformations. Match rules may be defined to choose which attributes are important for matching and to configure how the chosen attributes should be evaluated. Match rules may be tailored to specific business needs. Match rules may, for example, determine if two parties are the same and should be returned as a match or as a potential duplicate. Match rules may be executed when new data (such as new parties, for example) is entered into the source database 102 (irrespective of the manner such new parties are entered), upon searching the source database 102 or, for example, when finding and merging existing duplicates in the source database 102. According to the present invention, the match rules may support score based matching. Indeed, according to the present invention, match rules may be split into two phases: the acquisition phase and the scoring phase. In the acquisition phase, an initial set of possible matches (called a work unit—see 114 in FIG. 1) is obtained to increase efficiency when scoring. In the scoring phase, attributes of the work unit 114 are scored and the scores are used to further filter matches and rank the results.

The matching process, according to an embodiment of the present invention, may occur as follows:

The Acquisition Phase

1. The staged database 106 stores the transformed and standardized selected attribute values for comparison in the matching process;

2. An input record or records 108 are then submitted.

3. Transformation functions transform and standardize the input record 108 for the attributes defined in the match rule, as shown at 110 in FIG. 1.

4. The match criteria are then applied to the attribute values in the input record 108 that were transformed by the acquisition transformation functions 110. That is, the attribute values in the input record 108 that were transformed by the acquisition transformation functions 110 in the match rule are compared (as shown at 112 in FIG. 1) against the (previously transformed and standardized) attribute values that are stored in the staged database 106. The results of this application of the match criteria generates a set of matched acquisition attribute values that are the most relevant subset of records in the staged database 106. This set of matched attribute values forms the work unit 114. The work unit 114, therefore, includes all records from the staged database 106 having attribute values that match the transformed and standardized acquisition attribute values of the input record 108, as determined by the match rules for the selected attributes. Generating the work unit 114 is an efficient way to reduce the time and resources needed to complete the search, because only this relevant subset of records (and not the totality of the records stored in the staged database 106) need be compared against the transformed and standardized input record for scoring purposes.

The Scoring Phase

5. As suggested at reference 118 in FIG. 1, the attribute values in the input record 108 that are transformed by the scoring transformation functions in the match rule are compared against the attribute values in the work unit 114. Based on the match rule, a score is calculated for each record in the work unit 114.

6. The score of each record (which may be multiplied by a weighting factor) contained in the work unit 114 may be compared against a selectable match threshold, a selectable override threshold, and/or a selectable automatic merge threshold that may be defined in the match rule. Records of the work unit 114 with scores above the match threshold may then be selected as matches for the input record 108. The selected matches are shown at reference numeral 120 in FIG. 1.

For example, the table below displays a set of possible attributes:

| Attribute Name | Logical Entity |
| --- | --- |
| Party Name | Party |
| Address1 | Address |
| Country | Address |
| Identifying Address Flag | Address |

In this example, the acquisition attributes may be selected to be "Party Name", "Address1", "Country", and "Identifying Address" and the match criteria may include the criteria "Match Any Attributes". All of the returned records will then match the following attributes: Party Name OR Address1 and Country and Identifying Address. A SQL clause may also be used to filter the work unit 114.

According to an embodiment of the present invention, for batch duplicate identification, which finds existing duplicates in the source database 102, if the score assigned to a record in the work unit 114 exceeds a selectable automatic merge threshold, the record may be automatically marked as a candidate for merge (merging the two records so that only one records remains in the staged database 106 after the merge operation). According to another embodiment of the present invention, the input record 108 may be prevented from being stored in the source database 102 if a duplicate record is found in the staged database 106 to which a score has been assigned that exceeds a selectable override threshold.

As noted above, the match score assigned to each record of the work unit 114 may be compared against a selectable match threshold to determine if a record in the work unit 114 is a match. This is the minimum score, or match threshold, that a record in the work unit 114 must meet to be considered a match to the input record 108. That is, one of the scoring match criteria may implement the expression:

Match Score≧Match threshold=Match

The match score assigned to each record may also be compared against a selectable override threshold to determine if the record sought to be input into the source database 102 is a duplicate that should not be saved. That is, one of the match criteria may implement the expression:

Match Score≧Override threshold=Input Record is a duplicate and should not be saved To determine if an input record should be merged with an existing record, the match criteria may implement the expression:

Match Score≧Automatic Merge threshold=Input Record is a candidate for merge

The attributes that are used to assign a score to each of the records in the work unit 114 may be freely chosen, as these attributes do not have to be that same as those used in the acquisition phase. A greater number of attributes may be used for scoring as were used for acquisition. The attributes chosen to score the records in the work unit, however, must have been transformed and standardized. Each of the attributes selected for scoring may be assigned a score in order of importance. The attribute assigned the highest score should be that attribute that is determined to be the most relevant for a match. The score is awarded to a record of the work unit 114 only if the scoring attribute is evaluated as a match. If the attribute does not match, then a score of zero is assigned. At least one transformation function should be selected for each attribute selected for scoring. The selected transformation function(s) is/are then applied to that attribute before the input record 108 is compared to the record in the work unit 114. More than one transformation function may be selected for each of the attributes in the match rule. Percentage weights may be assigned to the transformation functions depending on how similar the transformed value of the attribute would be to the original values of the attribute. If a transformed attribute value is a match, the weight is multiplied by the score to determine the weighted score of the attribute. According to one embodiment, if an attribute is assigned more than one transformation function, the highest weighted score may be awarded to the record for the attribute.

A similarity matching option allows for non-exact matches by applying the similarity algorithm to transformed attribute values. The similarity algorithm compensates for unanticipated errors that the transformation functions do not catch. The similarity algorithm compares the transformed attribute value of the input record to the corresponding attribute value from the work unit record and assigns a percentage for the extent of similarity. An example of a calculation used to determine such a similarity percentage is presented below:

1. Determine the edit distance, or the number of changes required to make the longer string match the shorter string. For example, for Smythe and Smith, the edit distance is two.

2. Subtract the edit distance from the number of characters in the longest string. Following the example above: 6−2=4.

3. Divide the amount calculated in step 2 by the number of characters in the longest string. Continuing the example: 4/6=0.6666

4. Express the result as an integer. In this example, the result would be a similarity score of 67. If two strings are identical, then the similarity percentage equals 100. If no characters in the two strings are the same, then the similarity percentage is zero.

The similarity calculation above is but one exemplary implementation of a similarity algorithm that may be used in the present invention. It is understood, therefore, that other similarity algorithms may be used herein without departing from the scope of the present invention. If the similarity percentage is greater than or equal to a selectable similarity percentage, the attribute may be considered a match. The match score for the record is then the sum of the actual weighted attribute scores. This match score is the value that is compared to the match rule thresholds.

The match score, therefore, may be calculated for each attribute by multiplying the transformation weight with the attribute score, for example. The match score, according to an embodiment of the present invention, is the percentage of the sum of the actual scores over the sum of the maximum possible scores. This calculation allows the score to be a dynamic score depending on the number of attributes available in the input record.

$$\text{Match Score} = \frac{\sum_{\text{all scoring attributes}} (AttributeScore)(highest matching transformation weight)}{\sum_{\text{all available attributes}} (AttributeScore)(highest transformation weight)}$$

Match Rule Example

The example below shows the manner in which an effective match rule may be developed, with an emphasis on the scoring and threshold components. Additional exemplary match rules for searching are shown in Appendix B1.

Preparing for the Match Rule

1. Create a list of all of the attributes that should match between two matching records. This list should include attributes that are considered to be particularly important as well as attributes are less important but are still considered to be useful for matching purposes.

The table below shows an exemplary list of selected attributes:

| Attribute Name | Logical Entity |
|---|---|
| Party Name | Party |
| Phone Number | Contact Point |
| Address1 | Address |
| Country | Address |
| Postal Code | Address |
| Contact Last Name | Address |

2. Rank the order of importance of the attributes in the created list, such as shown in the table below:

| Rank | Attribute Name | Logical Entity |
|---|---|---|
| 1 | Party Name | Party |
| 2 | Phone Number | Contact Point |
| 3 | Contact Last Name | Contact |
| 4 | Address1 | Address |
| 5 | Country | Address |
| 6 | Postal Code | Address |

This ranking indicates that the attribute score assigned to party name is the highest and the scores are lower or stay the same further down the ranking.

3. Identify the minimum set of attributes thought to be required to match for records to be considered matches, for example:

Only the party name, or

Only the phone number

This indicates that the acquisition attributes should at least include party name and phone number and that matching any of these attributes is sufficient for a record to be included in the work unit 114.

4. Identify the sets of attributes that by themselves are not good enough to indicate matching records, but which, if they were close enough matches, might give additional credence to a match on the minimum set of party name and phone number identified above. For example, such attributes may include:

Only address;

Only country;

Only postal code;

Only address and country;

Only address and postal code;

Only country and postal code or

Only contact last name.

This selection determines the attributes that should be included as scoring attributes.

Defining the Acquisition and Scoring Components

1. Choose attributes from step 1 of the Preparing for the Match Rule section above that would select all of the possible matches. The attributes from step 3 of Preparing for the Match Rule above must be selected. Continuing with the present example, select:

Party Name;

Phone Number, and

Contact Last Name

2. Choose the attribute match criteria. Because two sets of attributes were selected in step 3 of Preparing for the Match Rule above, the "Match Any" attribute match criteria should be selected, so that matching any of the two selected attributes will result in a match.

3. Select attributes from step 1 of Preparing for the Match Rule above that are to be used in scoring the records of the work unit 114. The attributes from step 4 of Preparing for the Match Rule may be selected. The table below shows the scoring attributes:

| Attribute Name | Logical Entity |
|---|---|
| Party Name | Party |
| Phone Number | Contact Point |
| Address1 | Address |
| Country | Address |
| Postal Code | Address |
| Contact Last Name | Contact |

4. Assign scores to the scoring attributes in accordance with the ranking assigned to each selected attribute in step 2 of Preparing for the Match Rule above. The attributes having been assigned the highest rankings should receive the highest scores. In this example, the score assignments should reflect the following:

Matches on party name provide the best match results, so the party name attribute should be assigned the highest score.

Matches on a phone number might be the second best matching criterion, so the next highest score should be assigned to the phone number attribute.

Combinations of the address components and contact last name are the third best, so scores should be assigned according to relative importance.

The contact last name attribute is estimated to have about the same value as the address1 attribute and is scored accordingly.

The table below shows an exemplary scoring assignment for the selected scoring attributes:

| Attribute Name | Score |
| --- | --- |
| Party Name | 40 |
| Phone Number | 30 |
| Address1 | 15 |
| Country | 10 |
| Postal Code | 10 |
| Contact Last Name | 15 |

The total score for the attributes in this table is 120.

Setting the Match Threshold

1. Obtain minimum sets from step 3 of Preparing for the Match Rule and total attribute scores from step 4 of Defining the Acquisition and Scoring Components. That is, for the Party Name attribute, the total attribute score is 40 and for the Phone Number attribute, the total attribute score is 30.

2. Set a match threshold based on the lower score of the two minimum sets. In this example, the match threshold is 30. With the match threshold defined at 30, scoring may be interpreted as follows:

If only the phone number is a match, the record is a match because the match score equals the match threshold of 30.

If only the party name is a match, then the record is a match because the score exceeds the match threshold of 30.

If the country, postal code, and contact last name are a match, then the record is still a match because the attributes' combined score of 35 exceeds the match threshold of 30.

If the address1, country, and postal code are a match, then the record is a match because the attributes' combined score is 35, which again exceeds the match threshold of 30.

With the match threshold at 30, the table shows results of possible matches:

| Possible Matches | Cumulative Score | Match |
| --- | --- | --- |
| Party Name | 40 | Yes |
| Phone Number | 30 | Yes |
| County, Postal Code, and Contact Last Name | 35 | Yes |
| Address1, Country, and Postal Code | 35 | Yes |
| Party Name and Phone Number | 70 | Yes |
| Phone Number and Country | 40 | Yes |
| Address1 and Country | 25 | No |
| Country and Postal Code | 20 | No |
| Party Name, Address1, and Contact Last Name | 70 | Yes |

Such a match rule may be applied against the transformed and standardized attributes stored in the staged database 106 to generate a work unit containing a subset of the records thereof that satisfy the match rule, whereupon the records of the subset (i.e., the work unit 114) may be scored as detailed above to present a match, to prevent the inclusion of duplicates in the source database 102 and/or to merge records therein. Other exemplary match rules are shown in Appendix B1.

Duplicate Identification

The following describes setting up and using the duplicate identification functionality of the present invention to identify duplicates that may exist within the source database 102.

After the transformation functions and match rules have been defined and the staged database 106 created and populated, a duplicate identification process may be used to identify duplicates that may exist in the source database 102 and to select the parties that should be merged. The duplicate identification process compares entries within the staged database 106 and determines potential duplicates based on the selected match rule. For example, a subset of the parties in the staged parties table in the database 106 may be selected to run through the batch duplicate identification process. These records may be compared only against one another or against all records in the table. The batch identification process compares all records for each party. For example, each contact point for a party is compared against all contact points. Exemplary duplication match rules are shown in Appendix B2

Duplicate Identification Process

The duplicate identification process includes creating a duplicate identification batch that can consist of a subset of parties, creating merge batches from the duplicate identification batch, and submitting the merge batches to a merging process. The process for identifying potential duplicates is similar to the process used to obtain the records in the work unit 114. After having obtained the work unit 114, which includes records of all potential duplicates, the records of the work unit 114 should be reviewed for possible inclusion in a merge batch that consists of parties that that should be merged. The existing parties are then the merge-to parties and their potential duplicates are merge-from parties. A merge-from party may then be merged into the merge-to party during the party merge process. Exemplary batch duplicate identification match rules are shown in Appendix B3.

Hardware Description

Figure 6:
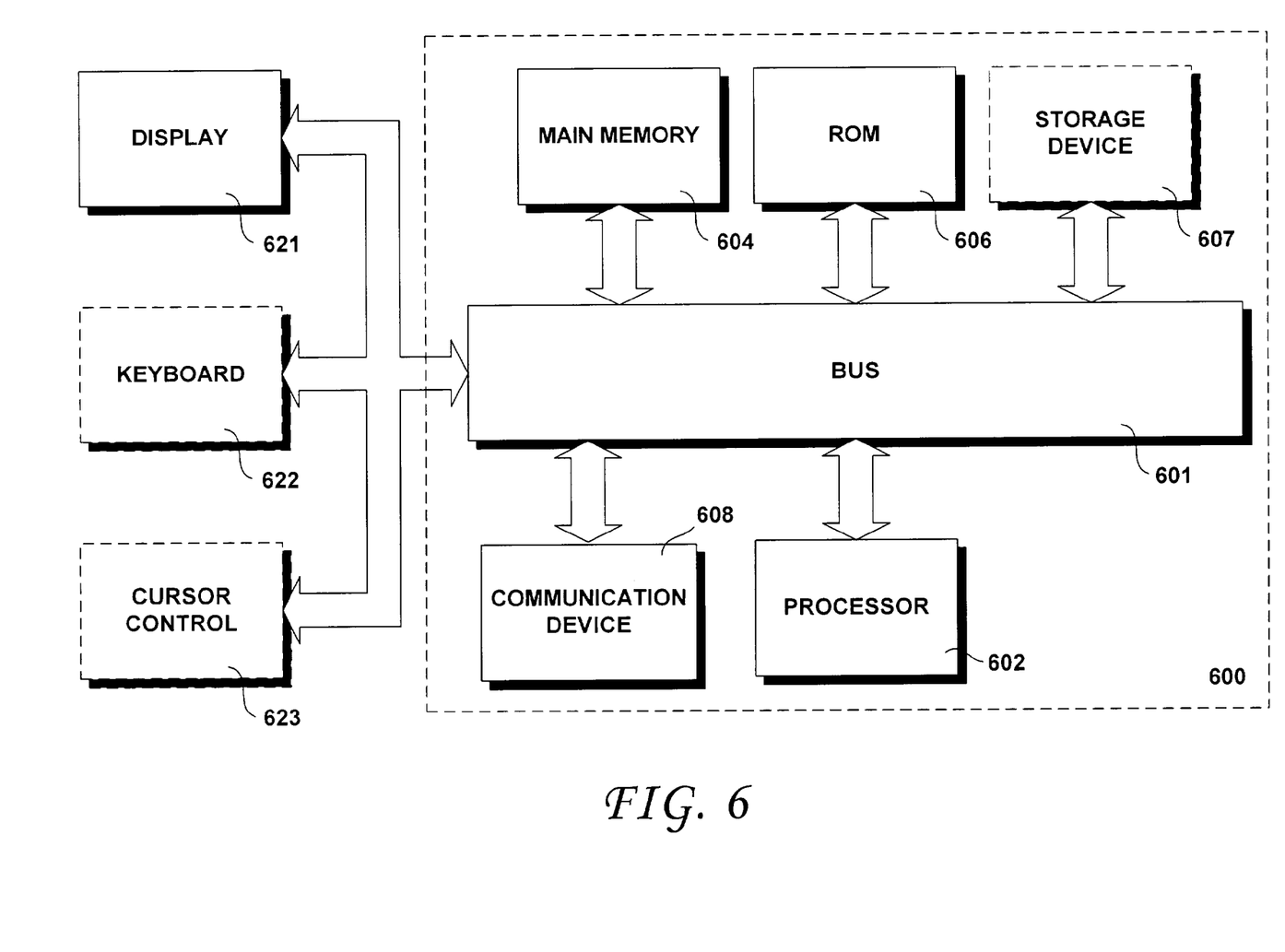
FIG. 6 is a block diagram of a computer with which the present invention may be practiced.

FIG. 6 illustrates a block diagram of a computing device 600 with which an embodiment of the present invention may be implemented. Computing device 600 includes a bus 601 or other communication mechanism for communicating information, and a processor 602 coupled with bus 601 for processing information. Computing device 600 further comprises a random access memory (RAM) or other dynamic storage device 604 (referred to as main memory), coupled to bus 601 for storing information and instructions to be executed by processor 602. Main memory 604 also may be used for storing temporary variables or other intermediate information during execution of instructions by processor 602. Computing device 600 may also include a read only memory (ROM) and/or other static storage device 606 coupled to bus 601 for storing static information and instructions for processor 602. A data storage device 607, such as a magnetic disk or optical disk, may be coupled to bus 601 for storing information and instructions. A communication device 608, such as a modem or network (such as Ethernet, for example) card is also coupled to the bus 601 to provide access to a network.

The computing device 600 may also be coupled via bus 601 to a display device 621, such as a cathode ray tube (CRT), for displaying information to a computer user. An alphanumeric input device 622, including alphanumeric and other keys, is typically coupled to bus 601 for communicating information and command selections to processor 602. Another type of user input device might be the user's own voice or cursor control 623, such as a mouse, a trackball, or cursor direction keys for communicating direction information and command selections to processor 602 and for controlling cursor movement on display 621.

The present invention is related to the use of computing device 600 configured for finding and scoring non-exact matches in a relational database according to the present invention, as disclosed above. According to one embodiment, the processing may be carried out by one or more computing devices 600 in response to processor(s) 602 executing sequences of instructions contained in memory 604. Such instructions may be read into memory 604 from another computer-readable medium, such as data storage device 607 and/or from a remotely located server. Execution of the sequences of instructions contained in memory 604 causes processor(s) 602 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

Appendix A

Seeded (Exemplary) Transformation Functions

Transformation functions may be preconfigured for the selected logical entities of (in the example developed herein, party, address, contact, and contact point). Customized transformation functions may also be created. Transformation functions, seeded or not, may also contain word replacements. The table below shows examples of the seeded transformation functions, the function and purpose of each, as well as examples of the transformation.

| Name | Staged | Operations (in order of execution) | Purpose | Example Input | Example Output |
|---|---|---|---|---|---|
| Exact | Yes | capitalize all letters<br>replace non-alpha and non-numeric characters with white space<br>reduce all instances of white space to a single white space | catch form errors | D' Angelo | D ANGELO |
| Exact % | Yes | pads the beginning and end of the input with % to tokenize the input<br>capitalize all letters<br>replace non-alpha and non-numeric characters with white space<br>reduce all instances of white space to a single white space | capturing the exact string and catch form errors | D' Angelo | % D ANGELO % |
| Cleansed | Yes | remove double letters<br>remove vowels<br>capitalize all letters<br>replace non-alpha and non-numeric characters with white space<br>reduce all instances of white space to a single white space | catch incorrect vowel usage and typing errors | D' Angello | D NGL |
| Cluster | Yes | remove all but first 4 letters of the first 2 words<br>capitalize all letters<br>replace non-alpha and non-numeric characters with white space<br>reduce all instances of white space to a single white space | catch spelling errors at the end of the word and minor form errors | D' Angelo | D ANGE |
| Remove White Spaces | Yes | remove all white spaces | catches incorrectly place white spaces | Pac Bell | PacBell |
| Reverse | No | reverse the ordering of the first two words | corrects incorrect ordering of words | Madison Mitchell | Mitchell Madison |
| WR-Person | Yes | Word Replacements for People Names | catches commonly know nicknames and spelling variations for and people names | Mike | MICHAEL |
| WR-Names | Yes | Word Replacements for Organization and People Names | catches commonly know nicknames, abbreviations, and spelling variations for organization and people names | Oracle Corp | Oracle CORPORATION |
| WR-Address | Yes | Word Replacements for Addresses | catches commonly know abbreviations for words used in the address | W. Main St. | WEST Main STREET |
| Email | No | remove extensions such as .com, .edu, .org. | Catches mistakes with extensions | Joe.smith@oracle.com | Joe.smith@oracle |

-continued

| Name | Staged | Operations (in order of execution) | Purpose | Example Input | Example Output |
|---|---|---|---|---|---|
| URL | No | remove extensions such as .com, .edu, .org. remove headers like 'http://' | Catches mistakes with headers and extensions | http://www.oracle.com | www.oracle |

APPENDIX B1

Exemplary Search Match Rules

Acquisition

| Attribute Name | Transformation Function |
|---|---|
| Party Name | Cleansed |
| | WRNames-Cluster |
| | Soundex |
| | Cluster |
| Account Name | Cleansed |
| | WRNames-Cluster |
| Party Number | Exact |
| Customer (Account) Number | Exact |
| Status | LOOKUP |
| Address1 | Cleansed |
| | Word Replacement-Address |
| Address2 | Cleansed |
| | Word Replacement-Address |
| City | Cleansed |
| | Word Replacement-Address |
| Postal Code | Cleansed-number |
| Province | Cleansed |
| | WRAddress-Cluster |
| Site Number | Cleansed-number |
| State | Cleansed |
| | WRAddress-Cluster |
| County | Cleansed |
| | WRAddress-Cluster |
| Country | LOOKUP |
| Contact Last Name | Cleansed |
| | WRPerson-Cluster |
| Contact First Name | Cleansed |
| | WRPerson-Cluster |
| Contact Phone | Cleansed-number |
| Customer Type (PARTY_TYPE) | LOOKUP |
| Taxpayer ID | Cleansed-number |
| Reference | Cleansed-number |
| Type | LOOKUP |
| Category | LOOKUP |
| SIC Code | Cleansed-number |
| SIC Code Type | LOOKUP |
| Class | LOOKUP |
| Tax Registration Number | Cleansed-number |

Scoring

| Attribute Name | Score | Transformation Function | Transformation Weight | Minimum Similarity Required for Match |
|---|---|---|---|---|
| Party Name | high-1 | Exact | 100 | 80 |
| | | Cleansed | 70 | 95 |
| | | Word Replacement-Names | 70 | 90 |
| | | Cluster | 70 | 90 |
| | | WPNames-Cluster | 60 | 95 |
| | | WPNames-Cleansed | 60 | 95 |
| | | Soundex | 40 | 100 |
| | | Acronym | 30 | 100 |
| Account Name | high-1 | Exact | 100 | 80 |
| | | Cleansed | 70 | 95 |
| | | Soundex | 20 | 100 |
| | | Word Replacement-Names | 70 | 90 |
| | | Acronym | 30 | 100 |
| | | Cluster | 70 | 90 |
| | | WRNames-Cluster | 60 | 95 |
| | | WRNames-Cleansed | 60 | 95 |
| Party Number | high-1 | Exact | 100 | 80 |
| Customer (Account) Number | high-1 | Exact | 100 | 80 |
| Address1 | MED | Exact | 100 | 80 |
| | | Cleansed | 70 | 95 |
| | | Word Replacement-Address | 70 | 90 |
| Address2 | MED | Exact | 100 | 80 |
| | | Cleansed | 70 | 95 |
| | | Word Replacement-Address | 70 | 90 |
| City | low-1 | Exact | 100 | 80 |
| | | Cleansed | 70 | 95 |
| | | Word Replacement-Address | 70 | 90 |
| | | Cluster | 50 | 90 |
| Postal Code | low-1 | Exact | 100 | 80 |
| Province | low-2 | Exact | 100 | 80 |
| | | Cleansed | 70 | 95 |
| Site Number | high-2 | Exact | 100 | 80 |
| State | low-2 | Exact | 100 | 80 |
| | | Cleansed | 70 | 95 |
| County | low-2 | Exact | 100 | 80 |
| | | Cleansed | 70 | 95 |
| Contact Last Name | high-2 | Exact | 100 | 80 |
| | | Cleansed | 70 | 95 |
| | | Soundex | 50 | 100 |
| | | Word Replacement-Person | 70 | 95 |
| Contact First Name | high-2 | Exact | 100 | 80 |
| | | Cleansed | 80 | 95 |
| | | Soundex | 60 | 100 |
| | | Word Replacement-Person | 70 | 95 |
| Contact Phone | high-2 | Exact | 100 | 80 |
| Taxpayer ID | high-2 | Exact | 100 | 80 |
| Reference | high-2 | Exact | 100 | 80 |
| SIC Code | low-1 | Exact | 100 | 80 |
| Tax Registration Number | high-2 | Exact | 100 | 80 |

APPENDIX B2

Exemplary Duplicate Identification Match Rules

| Attribute Name | Transformation Function |
|---|---|
| Party Name | Cleansed |
| | WRNames-Cluster |
| | Soundex |
| | WRNames-Cleansed |
| Party Number | Exact |

APPENDIX B2-continued

Exemplary Duplicate Identification Match Rules

| Attribute Name | Transformation Function |
|---|---|
| Address1 | Cleansed |
|  | Word Replacement-Address |

Scoring

| Attribute Name | Score | Transformation Function | Transformation Weight | Minimum Similarity Required for Match |
|---|---|---|---|---|
| Party Name | high-1 | Exact | 100 | 80 |
|  |  | Cleansed | 80 | 95 |
| Account Name | high-1 | Exact | 100 | 80 |
|  |  | Cleansed | 80 | 95 |
|  |  | Word Replacement-Names | 80 | 90 |
|  |  | Acronym | 40 | 100 |
|  |  | Cluster | 80 | 90 |
| Party Number | high-1 | Exact | 100 | 80 |
| Customer (Account) Number | high-1 | Exact | 100 | 80 |
| Address1 | MED | Exact | 100 | 80 |
|  |  | Cleansed | 80 | 95 |
|  |  | Word Replacement-Address | 80 | 90 |
| Address2 | MED | Exact | 100 | 80 |
|  |  | Cleansed | 80 | 95 |
|  |  | Word Replacement-Address | 80 | 90 |
| City | low-1 | Exact | 100 | 80 |
|  |  | Cleansed | 80 | 95 |
|  |  | Word Replacement-Address | 80 | 90 |
|  |  | Cluster | 60 | 90 |
| Postal Code | low-1 | Exact | 100 | 80 |
| Province | low-2 | Exact | 100 | 80 |
|  |  | Cleansed | 80 | 95 |
|  |  | Word Replacement-Address | 80 | 95 |
|  |  | Cluster | 80 | 90 |
| Site Number | high-2 | Exact | 100 | 80 |
| State | low-2 | Exact | 100 | 80 |
|  |  | Cleansed | 80 | 95 |
|  |  | Word Replacement-Address | 80 | 90 |
| County | low-2 | Exact | 100 | 80 |
|  |  | Cleansed | 80 | 95 |
|  |  | Word Replacement-Address | 80 | 90 |
|  |  | Acronym | 40 | 100 |
|  |  | Cluster | 80 | 90 |
| Contact Last Name | high-2 | Exact | 100 | 80 |
|  |  | Cleansed | 80 | 95 |
|  |  | Soundex | 60 | 100 |
|  |  | Word Replacement-Person | 70 | 95 |
|  |  | Cluster | 80 | 90 |
|  |  | WRPerson-Cluster | 70 | 95 |
|  |  | WRPerson-Cleansed | 70 | 95 |
| Contact First Name | high-2 | Exact | 100 | 80 |
|  |  | Cleansed | 80 | 95 |
|  |  | Soundex | 60 | 100 |
|  |  | Word Replacement-Person | 70 | 95 |
|  |  | Cluster | 80 | 90 |
|  |  | WRPerson-Cluster | 70 | 95 |
|  |  | WRPerson-Cleansed | 70 | 95 |
| Contact Phone | high-2 | Exact | 100 | 80 |
| Taxpayer ID | high-2 | Exact | 100 | 80 |
| Reference | high-2 | Exact | 100 | 80 |
| SIC Code | low-1 | Exact | 100 | 80 |
| Tax Registration Number | high-2 | Exact | 100 | 80 |

APPENDIX B3

Exemplary Batch Duplicate Identification Match Rules

Acquisition

| Attribute | Transformations |
|---|---|
| ORGANIZATION_NAME | Cleanse |
|  | WRNames-Cleanse |
| FIRST_NAME | Cleanse |
|  | WRPerson-Cluster, Cleansed |
| LAST_NAME | Cleanse |
|  | WRPerson-Cluster |
| ADDRESS1 | Cleansed |
|  | Word Replacement-Address |

Scoring

| Attribute | Score | Transformations | Transformation Weight | Minimum Similarity Required for Match |
|---|---|---|---|---|
| PARTY_TYPE | med-1 | NONE | — | — |
| COUNTRY | med-1 | NONE | — | — |
| POSTAL_CODE | med-1 | Exact | 100 | 80 |
| PARTY_NAME | high-1 | Exact | 100 | 95 |
| ADDRESS1 | med-2 | Exact | 100 | 80 |
|  |  | Cleansed | 80 | 90 |
|  |  | Word Replacement-Address | 80 | 90 |
| FLEX_FIELD_PHONE_NUMBER | high-2 | Exact | 100 | 70 |
| EMAIL |  | Exact | 100 | 90 |
|  |  | Cleansed-email | 80 | 95 |
| Tax Registration Number | high-1 | Exact | 100 | 75 |
| Taxpayer ID | high-1 | Exact | 100 | 75 |
| Reference | med-1 | Exact | 100 | 75 |
| SIC Code | med-2 | Exact | 100 | 75 |
| SIC Code Type | med-2 | LOV | — | — |
| DUNS Number | high-1 | Exact | 100 | 80 |

The invention claimed is:

1. A computer-implemented method of searching for exact and non-exact matches in a first database, comprising the steps of:

transforming and standardizing values of selected attributes stored in the first database according to selected first transformation functions while maintaining the first database unchanged;

storing the transformed and standardized values of the selected attributes in a second database that is separate from the first database;

providing an input record against which to compare contents of the second database;

transforming and standardizing values of selected attributes of the provided input record according to selected second transformation functions;

searching only the second database for at least one of exact and non-exact matches to the transformed and standardized values of the selected attributes of the input record according to selected match rules, and assigning a score to each of the at least one exact and non-exact matches, the score assigning step including assigning a percentage weight to each of the first transformation functions.

2. The method of claim 1, wherein the first transformation functions are the same as the second transformation functions.

3. The method of claim 1, wherein the first transformation functions includes at least one of the following steps:
removing non-alpha numeric characters;
removing vowels;
removing selected noise words;
removing double letters, and
converting to upper case.

4. The method of claim 1, wherein the first transformation functions include replacing at least one word of values of selected attributes stored in the first database with a replacement word.

5. The method of claim 4, wherein the replacement word is stored in a replacement table that maps variations of a selected word onto a standardized version of the selected word.

6. The method of claim 1, wherein the selected match rules include scoring criteria and wherein the score is assigned to each of the at least one exact and non-exact matches according to the scoring criteria.

7. The method of claim 6, further comprising the step of providing the at least one of exact and non-exact matches according to the assigned score.

8. The method of claim 1, wherein the searching step includes a step of returning a set of at least one potential matching record within the second database, the at least one potential matching record of the set containing attributes that match the transformed and standardized values of the selected attributes of the provided input record.

9. The method of claim 8, wherein the selected match rules include scoring criteria and wherein the method further includes a step assigning the score to each record of the returned set according to the scoring criteria.

10. The method of claim 9, further including weighting the assigned score by a selected weight.

11. The method of claim 9, further including a step of comparing the score assigned to each record of the returned set against a selected threshold and returning as matches only those records of the returned set having assigned scores above the selected threshold.

12. The method of claim 1, wherein, for non-exact matches, the method further comprises the step of determining an extent of similarity between the transformed and standardized values of the selected attributes of the provided input record and values of the corresponding attributes in the second database.

13. The method of claim 12, wherein the extent of similarity is determined by:

determining an edit distance between the non-exact matches and the transformed and standardized values of the selected attributes of the provided input record, the edit distance being equal to a number of changes required to make the non-exact matches match the transformed and standardized values of the selected attributes of the provided input record exactly;

subtracting the edit distance from a number of characters in a longest one of the non-exact matches;

dividing a result of the subtracting step by a number of characters in a longest one of the non-exact matches, and expressing a result of the dividing step as an integer.

14. The method of claim 1, further including a step of maintaining the second database in synchronism with the first database.

15. A computer-implemented method of maintaining records in a first database, the first database storing a plurality of attributes, the method comprising:

a first transforming and standardizing step to transform and standardize values of selected attributes stored in the first database according to first transformation and standardization functions while maintaining the first database unchanged;

a storing step to store the transformed and standardized attribute values in a second database that is separate from the first database;

a providing step to provide an input record against which to compare contents of the second database;

a second transforming and standardizing step to transform and standardize values of the attributes of the provided input record according to second transformation and standardization functions;

an applying step to apply match rules to compare the standardized attribute values of the provided input record to the standardized attribute values stored in the second database, and to identify a set of potential duplicate records based upon results of the application of the match rules;

scoring the set of potential duplicate records, the scoring step including a step of assigning a percentage weight to each of the first transformation functions, and carrying out one of:
merging the provided input record with the at least one record of the set of potential duplicate records; and
preventing the provided input record from being incorporated in the first database.

16. The method of claim 15, wherein the first and second transforming and standardizing steps apply identical transformation functions to the attribute values of the attributes stored in the database and to corresponding attribute values of the provided input record.

17. The method of claim 15, wherein the assigned weight is dependent upon a degree of similarity between the transformed and standardized attribute values and corresponding values stored in the first database.

18. A database system, comprising:

a first database that stores attributes and corresponding values of the attributes;

first means for reading, transforming and standardizing the attribute values stored in the first database according to selected first transformation functions such that an effect of typographical errors and variations in the stored attribute values is minimized, the first means maintaining the first database unchanged;

a second database coupled to the first means, the second database storing the transformed and standardized attribute values, and second means for searching only the second database for exact and non-exact matches to an input record or for duplicates according to selected match rules, wherein the selected match rules include scoring criteria and wherein a score is assigned to each of the at least one exact and non-exact matches according to the scoring criteria, and wherein the second means is further configured to assign a percentage weight to each of the first transformation functions.

19. The database system of claim 18, further including means for maintaining the second database in synchronism with the first database.

20. The database system of claim 18, wherein the first means is configured to carry out at least one of the following steps on the values of the attributes:

removing non-alpha numeric characters;
removing vowels;
removing selected noise words;
removing double letters, and
converting to upper case.

21. The database system of claim 18, wherein the first means is configured to replace at least one word of values of selected attributes stored in the first database with a replacement word.

22. The database system of claim 21, wherein the replacement word is stored in a replacement table that maps variations of a selected word onto a standardized version of the selected word.

23. The database system of claim 18, wherein the second means is further configured to return a set of at least one potential matching record within the second database, the at least one potential matching record of the set containing attributes that match the transformed and standardized values of the selected attributes of the provided input record.

24. The database system of claim 23, wherein the selected match rules include scoring criteria and wherein the second means is further configured to assign the score to each record of the returned set according to the scoring criteria.

25. The database system of claim 18, wherein, for non-exact matches, the second means is further configured to determine an extent of similarity between the transformed and standardized values of the selected attributes of the provided input record and values of the corresponding attributes in the second database.

26. The database system of claim 25, wherein the extent of similarity is determined by:

determining an edit distance between the non exact matches and the transformed and standardized values of the selected attributes of the provided input record, the edit distance being equal to a number of changes required to make the non-exact matches match the transformed and standardized values of the selected attributes of the provided input record exactly;

subtracting the edit distance from a number of characters in a longest one of the non-exact matches;

dividing a result of the subtracting step by a number of characters in a longest one of the non-exact matches, and expressing a result of the dividing step as an integer.

* * * * *